United States Patent
Janakiraman et al.

(10) Patent No.: US 9,450,880 B2
(45) Date of Patent: Sep. 20, 2016

(54) LOAD CONDITION BASED TRANSFER OF PROCESSING RESPONSIBILITY

(71) Applicant: Hewlett-Packard Development Company, L.P., Houston, TX (US)

(72) Inventors: Ramsundar Janakiraman, Sunnyvale, CA (US); Avinash Sridharan, Santa Clara, CA (US); Ravinder Verma, San Jose, CA (US); Prasad Palkar, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/881,737

(22) Filed: Oct. 13, 2015

(65) Prior Publication Data

US 2016/0036709 A1   Feb. 4, 2016

Related U.S. Application Data

(62) Division of application No. 13/692,608, filed on Dec. 3, 2012, now Pat. No. 9,160,671.

(51) Int. Cl.
| | |
|---|---|
| *H04L 12/851* | (2013.01) |
| *H04L 29/06* | (2006.01) |
| *H04L 29/08* | (2006.01) |
| *H04L 12/743* | (2013.01) |

(52) U.S. Cl.
CPC ....... *H04L 47/2433* (2013.01); *H04L 45/7457* (2013.01); *H04L 67/1036* (2013.01); *H04L 69/22* (2013.01)

(58) Field of Classification Search
CPC .............................. H04L 47/00; H04L 47/125
See application file for complete search history.

(56) References Cited

U.S. PATENT DOCUMENTS

| | | | |
|---|---|---|---|
| 2007/0195777 A1 | 8/2007 | Tatar et al. | |
| 2007/0223372 A1* | 9/2007 | Haalen | H04L 45/38 370/229 |
| 2010/0214913 A1* | 8/2010 | Kompella | H04L 12/5695 370/230 |
| 2011/0252127 A1* | 10/2011 | Iyengar | G06F 9/5033 709/224 |
| 2013/0286833 A1* | 10/2013 | Torres | H04L 69/24 370/235 |
| 2013/0322244 A1 | 12/2013 | Matthews | |
| 2014/0086255 A1 | 3/2014 | Gooch et al. | |
| 2014/0126374 A1* | 5/2014 | Wang | H04L 67/1029 370/235 |

* cited by examiner

*Primary Examiner* — Shaq Taha

(57) ABSTRACT

According to one embodiment, a method comprises an operation of determining whether an ingress control message is locally terminated control traffic on a digital device prior to the ingress control message being forwarded to a hardware processor of the digital device for processing. A priority is assigned to the ingress control message based on information within the ingress control message, if the ingress control message is determined to be locally terminated control logic.

18 Claims, 14 Drawing Sheets

| BUFFER POOL | Traffic type |
| --- | --- |
| 0 | Not used |
| 1 | Default queue |
| 2 | Not used |
| 3 | GRE (HB) |
| 4 | Not used |
| 5 | Not used |
| 6 | LACP, CDP |
| 7 | PVST, xSTP, LLDP, VRRP |
| 8 | Not used |
| 9 | PAPI, CFGM |
| 10 | IKE |
| 11 | ARP, HTTP (CAP), DHCP, DNS |
| 12 | Not used |
| 13 | SNMP |
| 14 | TFTP, FTP, SSH, TELNET, HTTP |
| 15 | SYSLOG |
| 16 | Not used |
| 17 | Not used |
| 18 | Internal NAE traffic (DTR->NAE) |
| 19 | Not used |

FIG. 8

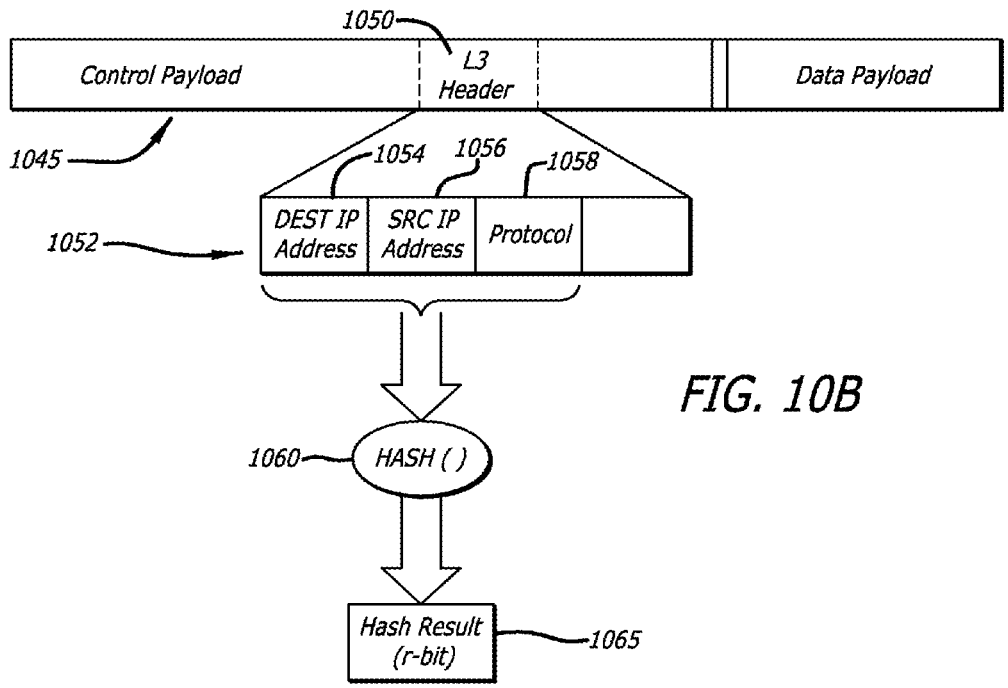
FIG. 10B
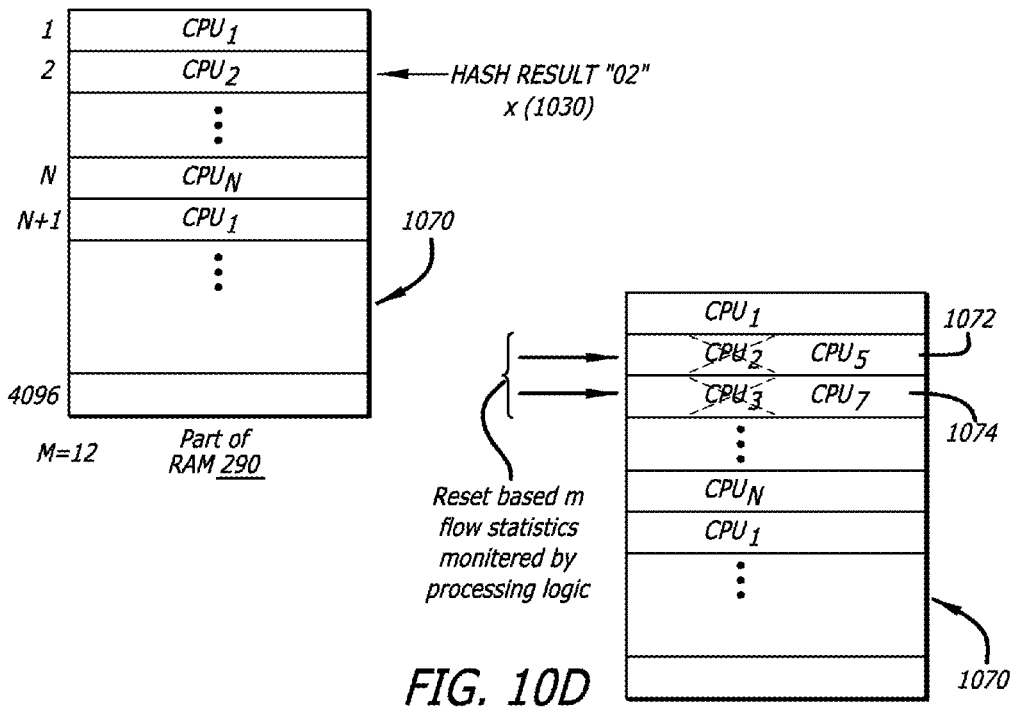
FIG. 10C
FIG. 10D

LOAD CONDITION BASED TRANSFER OF PROCESSING RESPONSIBILITY

CROSS-REFERENCE TO RELATED APPLICATION

This application is a divisional of co-pending U.S. patent application Ser. No. 13/692,608, filed Dec. 3, 2012, the entire contents of which are hereby incorporated by reference as though fully set forth herein.

FIELD

Embodiments of the disclosure relate to the field of communications, and in particular, to a system, digital device and method that is directed to the managed distribution of communications.

GENERAL BACKGROUND

In recent years, digital communications have become an essential function in virtually every digital device, ranging from miniature hand-held digital devices (e.g. cameras, dual-mode cellular telephones, etc.) to networking equipment (e.g. controllers, routers, etc.). For instance, digital devices may be connected to a local area network (LAN) through Ethernet adapters for wired network communications, or wireless adapters such as those operating according to the well-known IEEE 802.11a/ac/b/g/n standards. Such connectivity enables information to be communicated with other digital devices directly or indirectly connected to the LAN.

In a centralized communication scheme, information commonly in the form of "packets" is forwarded from a digital device connected to the network to another digital device that controls functionality of the network, referred to as a "controller". Packet communications may be point-to-point, in which ingress packets are terminated at the controller, or carried out in a packet switching environment, in which the ingress packets in a given communication are terminated at the controller or are transient. Transient packets are packets that are received by the controller and are targeted to be forwarded to another device.

Many conventional controllers feature software-based packet forwarding, which poses a significant problem during oversubscription, namely a condition in which the controller is unable to process all of the ingress packets received via its ports. Without undergoing additional expense and labor to upgrade the controller, during oversubscription, ingress packets are simply dropped as needed. This poses a problem as there is no functionality within the packet-forwarding software to prioritize packets so that, as an example, packets terminated at the controller are given a higher processing priority than transient packets and/or are buffered accordingly.

BRIEF DESCRIPTION OF THE DRAWINGS

The invention may best be understood by referring to the following description and accompanying drawings that are used to illustrate embodiments of the disclosure.

FIG. 8 is an exemplary embodiment of the packet classification mapping for assignment of priority based on ingress control message protocol.

FIGS. 10B-10D are exemplary block diagrams illustrating dynamic load balancing of traffic flow of ingress packets to processors based on statistical information feedback.

DETAILED DESCRIPTION

Figure 1:
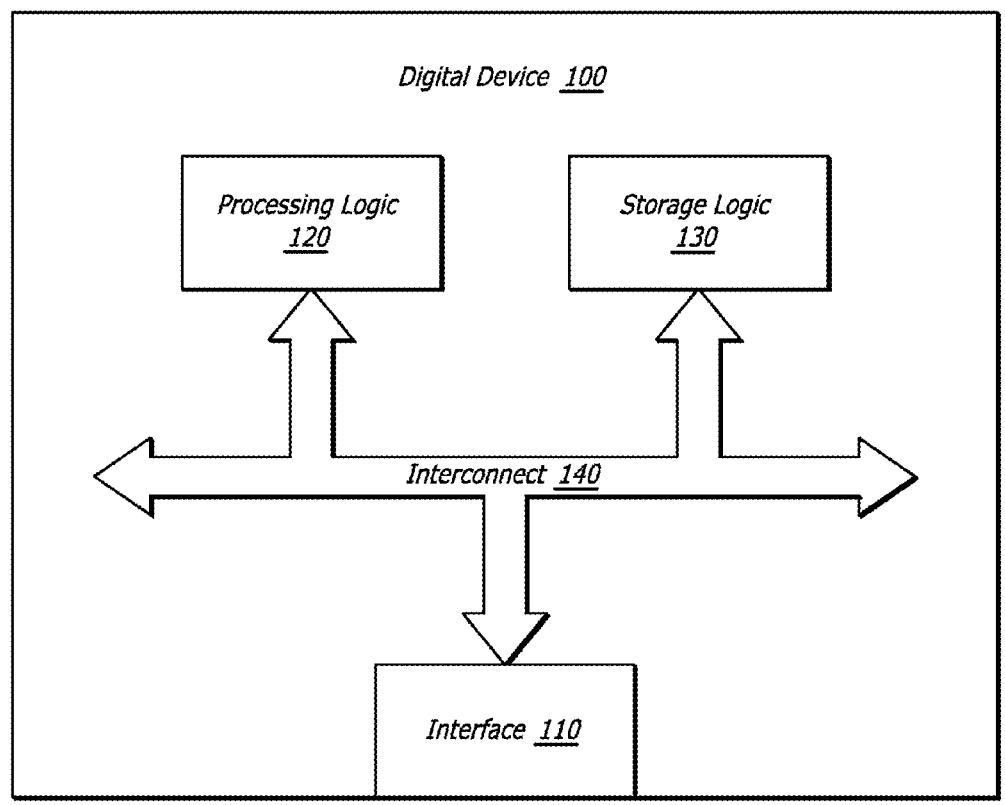
FIG. 1 is an exemplary embodiment of a digital device incorporating an ingress packet prioritization scheme.

Embodiments of the disclosure relate to a system, a digital device and method for classifying and prioritizing ingress messages, especially locally destined/terminated control messages, closer to the ingress network interface and prior to providing the ingress messages to forwarding engines and/or data plane processors for processing. The objective of classifying and prioritizing locally destined/terminated control messages, as compared to transient traffic, is to segregate the allocation of resources (such as packet buffers/RX descriptors) to locally destined/terminated control messages and transient traffic. This segregation is particularly useful in the case of an oversubscription of "transient" messages, referred to as "network congestion", since due to the segregation, even in case of oversubscription of transient messages in the network where there are enough resources (packet buffers) available for processing of locally destined/terminated control message. Processing of locally destined/terminated control messages is extremely critical to mitigate "network congestion". Thus, classifying and prioritizing ingress messages especially locally destined/terminated control messages allow the system to function efficiently even when the network is congested. It is contemplated that the classification and prioritization may be performed continuously in order to improve network stability.

The classification and/or prioritization can be determined, prior to providing the ingress message to the data plane processors, based on one or more of the following: (a) control plane destined traffic (e.g. locally-terminated control traffic) vs. traffic forwarded back to the network that was not targeted to the control plane of the digital device (e.g. transient control traffic); (b) protocol based prioritization, e.g., OSPF vs. IKE; and/or (c) DSCP/IP/WMM/QoS based prioritization for transient control traffic.

According to one embodiment of the disclosure, content addressable memory (CAM) is used to store Open Systems Interconnection (OSI) Layer 3 (L3) and OSI Layer 4 (L4) information for detecting "locally-terminated" ingress messages, namely messages directed to one or more processes running on the control plane of the digital device that will consume the message or cause one or more processes to return a reply (e.g., an Acknowledgement "ACK"), and "transient" messages (to be forwarded to the network). This detection for use in classifying the message may involve a hierarchical review of the L3 information (e.g., Destination IP "DEST IP" address), and thereafter, L4 information (e.g., port information).

For instance, in accordance with L3 information review, a first portion of address information within the ingress message is compared to a partial terminating address stored in a first (fast) memory having a first access latency. If a partial address hit is determined, a complete address review is conducted by accessing address information stored in a second (slow) memory having a second access latency greater than the first memory. Where the first memory is a low-latency, asynchronous access memory (e.g. content addressable memory "CAM") and the second memory is static random access memory (SRAM), a hardware-based partial address lookup is performed with a software-based complete address lookup being subsequently performed outside the CAM due to size constraints of the CAM. Furthermore, in accordance with L4 information review, port information is compared to port information stored within the CAM.

After classification as a locally-terminated message, the ingress message is assigned a priority using information within the message itself. For instance, the protocol may be used to prioritize the message.

Since a regular lookup algorithm in accordance with a hash or tree scheme requires multiple lookups to the shared memory, multiple CAM lookups may be used to identify the prioritized traffic by programming EthernetType (ETYPE), DEST port and SRC ports (in some scenarios like RADIUS server interactions the responses need to be prioritized, which is actually in the SRC port on which the RADIUS server responds).

In addition to prioritization, an embodiment of the disclosure is further related to dynamic load balancing of traffic. Across data plane processors, associated with these ingress messages in order to improve overall network performance. The dynamic load balancing may be based on packet type, priority or classification.

Herein, certain terminology is used to describe features for embodiments of the disclosure. For example, the term "digital device" generally refers to any hardware device that includes processing circuitry running at least one process adapted to manage the flow of control traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller.

One type of digital device, referred to as a "controller," is a combination of hardware, software, and/or firmware that is configured to process and/or forward information between digital devices within a network. According to one embodiment, the controller comprises a plurality of logic units that are adapted to manage ingress packets, one of these logic units being the control plane that processes control information used for the creation, operation, and management of the network.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") and process" are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of data such as a packet, a frame, a stream (e.g., a sequence of packets or frames), an Asynchronous Transfer Mode (ATM) cell, or any other series of bits having a prescribed format. Herein, a message comprises a control payload and a data payload. The control payload is adapted to include control information such as source and destination Internet Protocol (IP) addresses (e.g., IPv4 or IPv6 addressing), protocol, source and destination port information, and/or packet type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. For instance, illustrative embodiments describe message classification, prioritization and other inventive aspects conducted for an ingress control packet, such as deep packet inspection of parameters within L2 and/or L3 headers of the packet. Such discussions are for illustrative purposes and do not preclude this invention from being conducted on messages having formats other than described. Also, well-known logic and operations may not set forth in detail in order to avoid unnecessarily obscuring this description.

I. General Architecture

Referring to FIG. 1, an exemplary embodiment of a digital device 100 is shown. In accordance with one embodiment of the disclosure, digital device 100 comprises an interface 110, processing logic 120 and storage logic 130, in which one or more of these logic units are coupled together via an interconnect 140.

Herein, interface 110 enables digital device 100 to communicate with other devices supporting wired and/or wireless connectivity. For instance, interface 110 may be implemented as a wireless adapter (e.g., one or more radios, antenna(s) or the like) adapted to receive ingress messages and/or a wired adapter (e.g. connector) through which ingress messages are received over a wired interconnect.

Processing logic 120 is adapted with logic to classify ingress packets, and where appropriate, assign priority to these classified ingress packets. The classification scheme may be revised through the use of one or more access control lists (ALUs) that enable administrator controlled modification of content addressable memory (CAM), which is used for message classification. Also, processor load may be adjusted through recordation of message flow distribution among the processors and dynamic alternation at runtime of processor identifiers within a shared table used for load balancing.

As further shown in FIG. 1, storage logic 130 is volatile and/or non-volatile memory implemented within digital device 100 and utilized by processing logic 120. According to one embodiment of the disclosure, storage logic 130 features content addressable memory (CAM) and/or random access memory (RAM) accessible by processing logic 120.

Figure 2A:
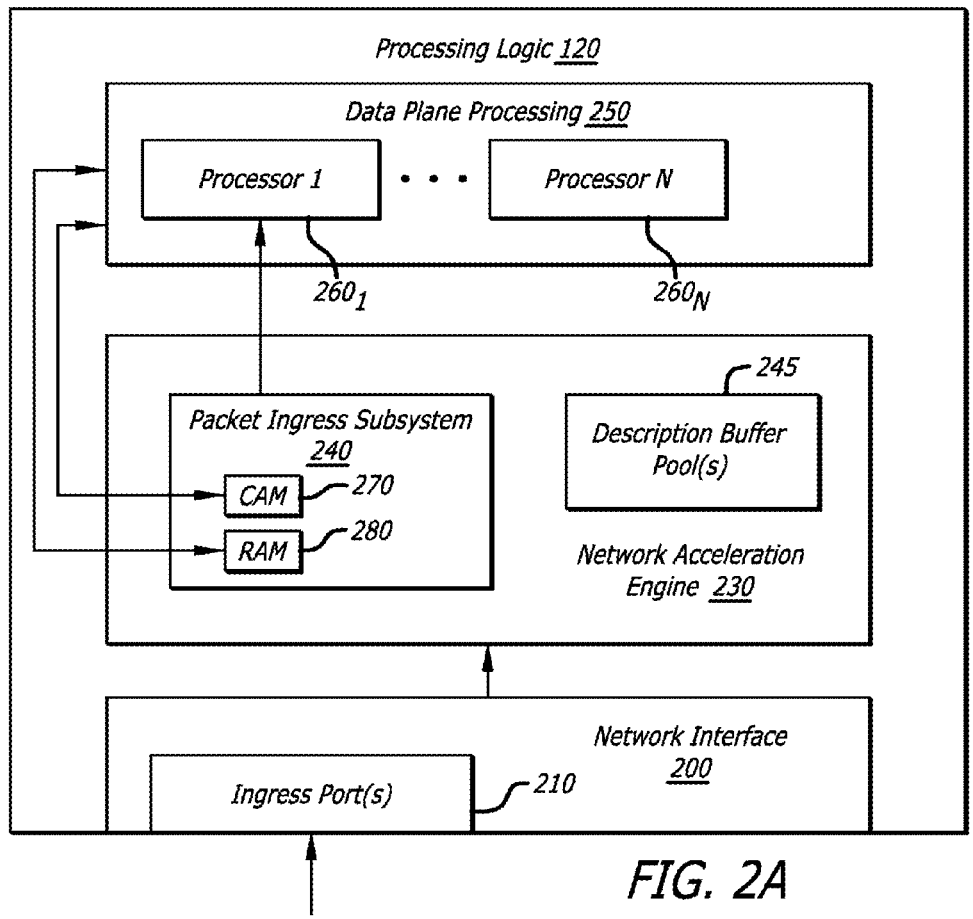
FIG. 2A is an exemplary embodiment of the processing logic deployed within the digital device of FIG. 1.

Referring now to FIG. 2A, an exemplary embodiment of processing logic 120 deployed within digital device of FIG. 1 is shown. Herein, processing logic 120 comprises a network interface 200, a network acceleration engine 230 and data plane processing circuitry 250. Herein, network interface 200 comprises one or more communication ports 210 through which messages are received and/or transmitted.

Network acceleration engine 230 is responsible for pre-processing ingress messages and redirecting information associated with such messages to one or more processors, namely processors $260_1$-$260_N$ (N≥1) being part of processing circuitry 250. Network accelerator engine 230 comprises a message ingress subsystem 240 and a descriptor buffer pool 245.

Message ingress subsystem 240 analyzes the control payload of the message (packet), in comparison with stored information corresponding to active processes running on the control plane of the digital device, to determine if the message is associated with "locally-terminated" traffic or "transient" traffic. As locally-terminated traffic, the message is assigned a priority based on information within the message itself.

As an illustrative example, message ingress subsystem 240 analyzes the message type and, based on the analysis, determines whether the ingress message is to be distributed for processing without prioritization. For instance, Address Resolution Protocol (ARP) and Neighbor Discovery messages are examples of locally-terminated ingress messages that are forwarded without prioritization. Instead, information within the ingress message is distributed to one of the processors in accordance with a selected distribution procedure (e.g. round-robin, etc.).

Message ingress subsystem 240 is further configured to inspect the control payload of an ingress [control] message in order to determine if the ingress message is "locally-terminated" [control] traffic or "transient" [control] traffic. If the later, the "transient" message may be assigned a default priority or assigned a priority based on its quality of service (QoS) setting for example. For instance, four (4) buffer pools may be allocated for different QoS levels, with each buffer pool corresponding to a different priority.

However, if the ingress [control] message is locally-terminated [control] traffic, message ingress subsystem 240 performs further processing to determine the priority assigned to the message. The priority may be based on information within the control payload of the message, such as protocol information (normally contained within the L3 packet header of a packet). Information within content addressable memory (CAM) 270 and random access memory (RAM) 280 is utilized for the inspection of the message as described below.

Figure 2B:
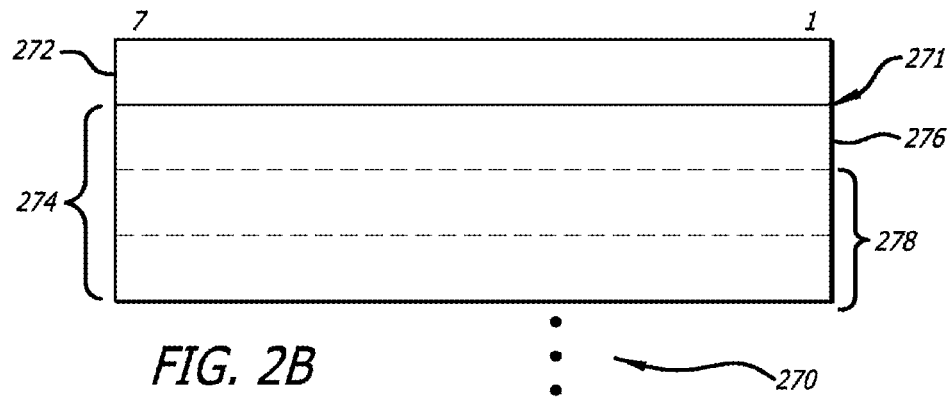
FIG. 2B is an exemplary embodiment of an entry within the content addressable memory (CAM) accessible by logic within the message ingress subsystem.

As shown, FIG. 2B is an exemplary embodiment of an entry 271 within CAM 270 that is accessible by logic within message ingress subsystem 240. In particular, CAM entry 271 is a multi-byte memory element that comprises a first area 272 adapted to store information to identify the type of information contained in a second area 274. For example, first area 272 may store a value (x01) that identifies CAM entry 271 is associated with a locally-terminated IP address (an "IP Address" type CAM entry).

As another illustrative example, first area 272 may store a different value (x10) that identifies CAM entry 271 is associated with a locally-terminated message directed to an active port on the control plane. As the port may be a destination (DES) or source (SRC) port, a portion of second area (e.g., second byte) 274 may be used as a port type field that identifies if the stored port number is associated with a DES port or a SRC port. For this example, the remaining portion (2-bytes) of CAM entry 271 is used to identify the particular port number.

Figure 3:
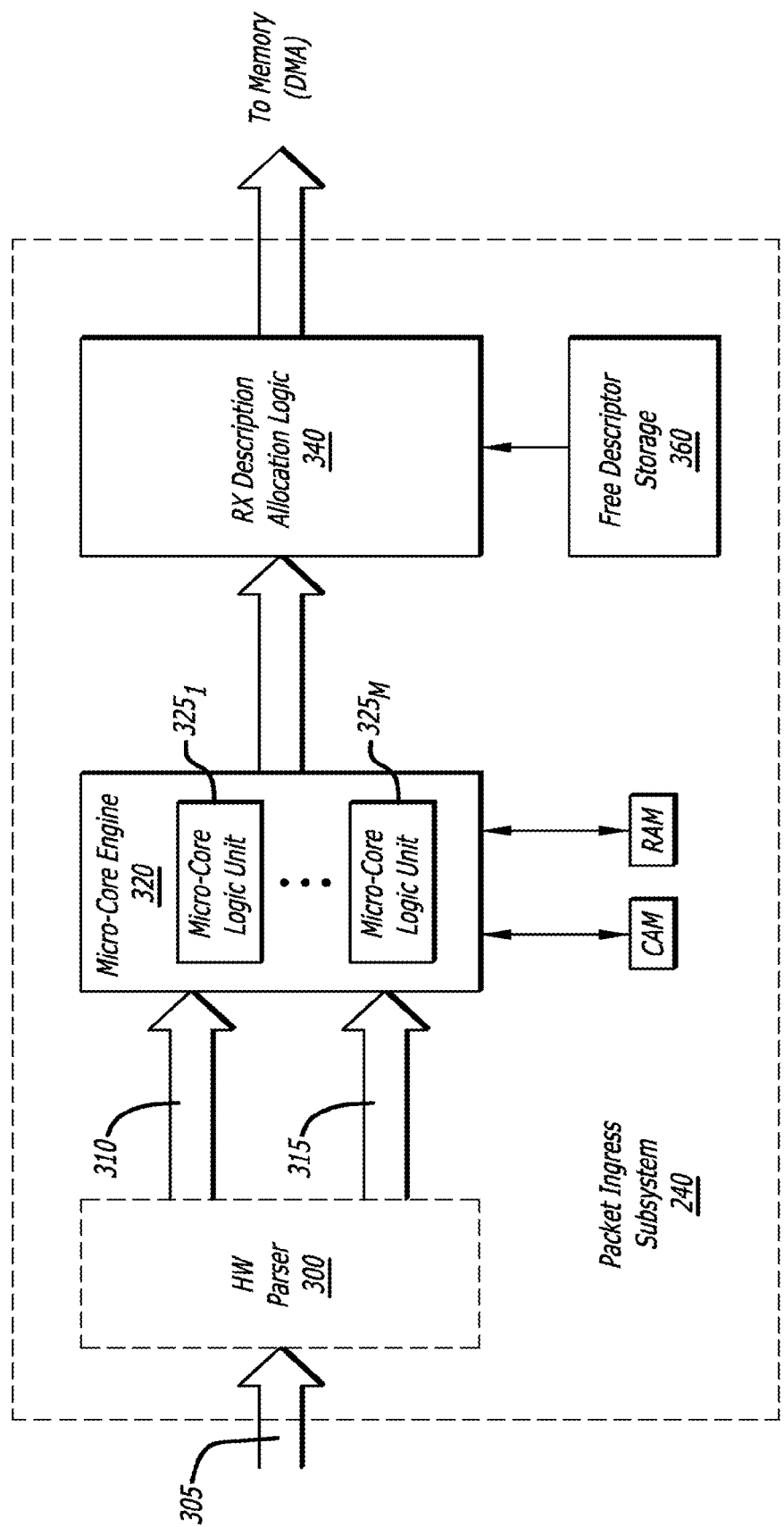
FIG. 3 is an exemplary embodiment of the message ingress subsystem of FIG. 2A.

Referring to FIG. 3, an exemplary embodiment of message ingress subsystem of FIG. 2A is shown. Packet ingress subsystem 240 comprises an optional hardware parser 300, a micro-core engine 320, receive (RX) descriptor allocation logic 340, and descriptor storage 360.

Hardware parser 300 is logic that parses an ingress [control] message 305 and forwards parsed information 310 (e.g., L2, L3 and/or L4 header information) to micro-core engine 320. Hardware parser 300 further generates a packet key 315. The packet key is used to perform a configurable hash operation for dynamic load balancing as described in FIGS. 10A-10D.

Micro-core engine 320 comprises a plurality of micro-core logic units $325_1$-$325_M$ ($M \geq 2$). For instance, according to one embodiment of the disclosure, micro-core logic units $325_1$-$325_M$ may be programmable MIPS cores. Each micro-core logic unit $325_i$ includes volatile memory and CAM space shared with processors $260_1$-$260_N$ of FIG. 2. A predetermined number of bytes (e.g., first 448 bytes) of ingress [control] message 305 are available for inspection by micro-core logic unit $325_i$ for message classification and prioritization.

RX descriptor allocation logic 340 is responsible for allocating message descriptors from descriptor storage 360 that correspond to the ingress messages. Each message descriptor enables one of the processor $260_1$-$260_N$ of FIG. 2A to access stored information associated with ingress message 305.

II. Message Classification and Prioritization

Figure 4:
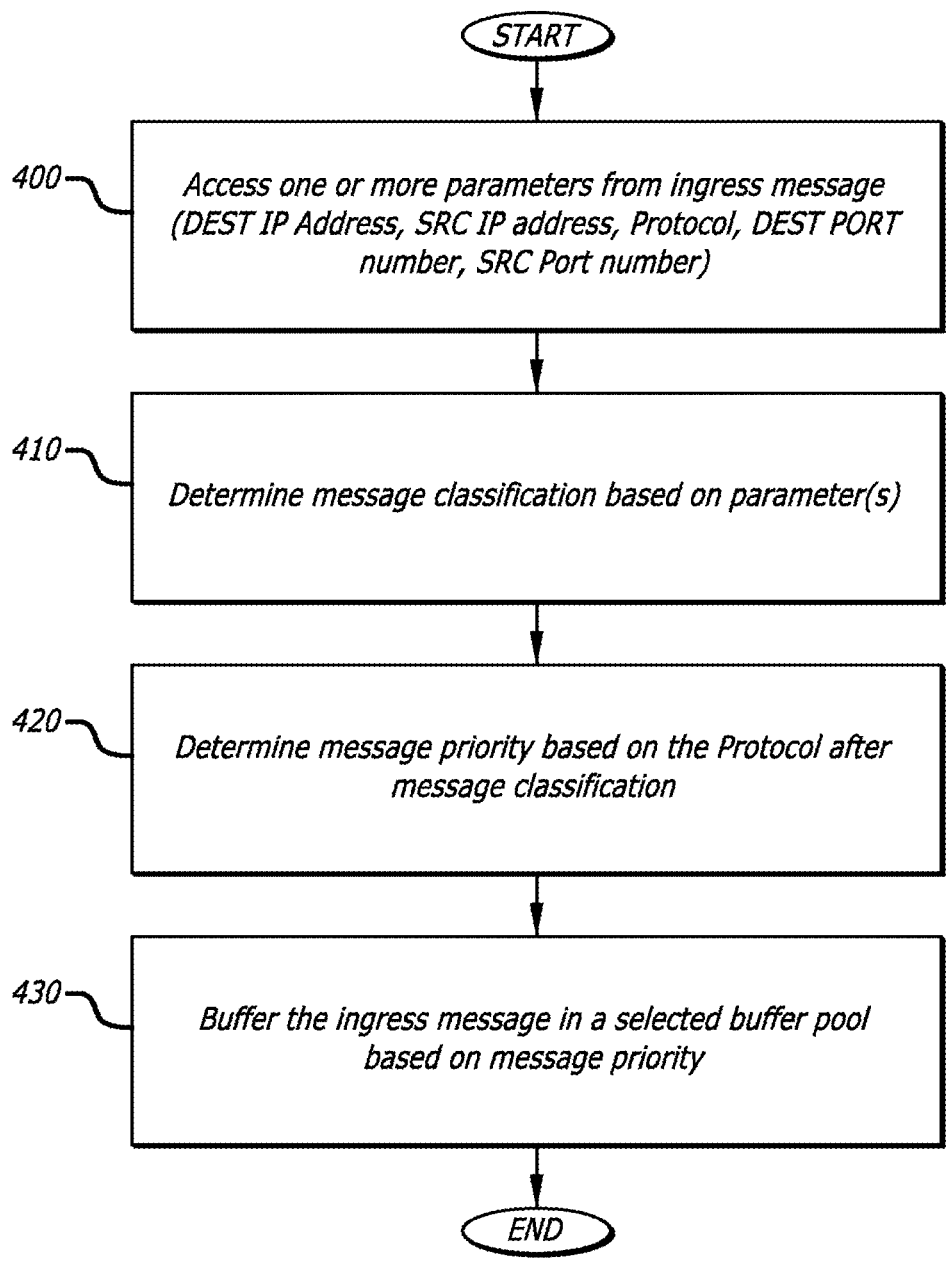
FIG. 4 is an exemplary embodiment of a flowchart outlining general message inspection operations conducted by message ingress subsystem 240 of FIG. 2A for classifying and prioritizing a locally-terminated ingress control message.

Referring to FIG. 4, an exemplary embodiment of a flowchart outlining general message inspection operations conducted by message ingress subsystem 240 of FIG. 2A for classifying and prioritizing a locally-terminated ingress [control] message is shown. Herein, the message ingress subsystem accesses one or more parameters from the ingress [control] message (block 400). These parameters include one or more of the following: (1) destination IP (DEST IP) address, (2) source IP (SRC IP) address, (3) protocol, (4) destination port number (DEST PORT), and/or (5) source port number (SRC PORT).

Next, the message ingress subsystem determines the message classification based one or more of these parameters (block 410). For instance, message ingress subsystem 240 may analyze the DEST IP address and the DEST PORT to determine that the ingress message is a locally-terminated message, namely a message that is directed to an active process running on the control plane that will either consume the message or issue a reply. Thereafter, packet priority is determined based on the protocol used in the data payload of the ingress message (block 420).

Upon determining the classification and priority, the ingress message is temporarily stored in a particular buffer pool and a message descriptor is assigned to the ingress message (block 430). The message descriptor identifies the memory location into which the ingress message is temporarily stored and is used by the processor corresponding to that particular buffer pool.

Figure 5:
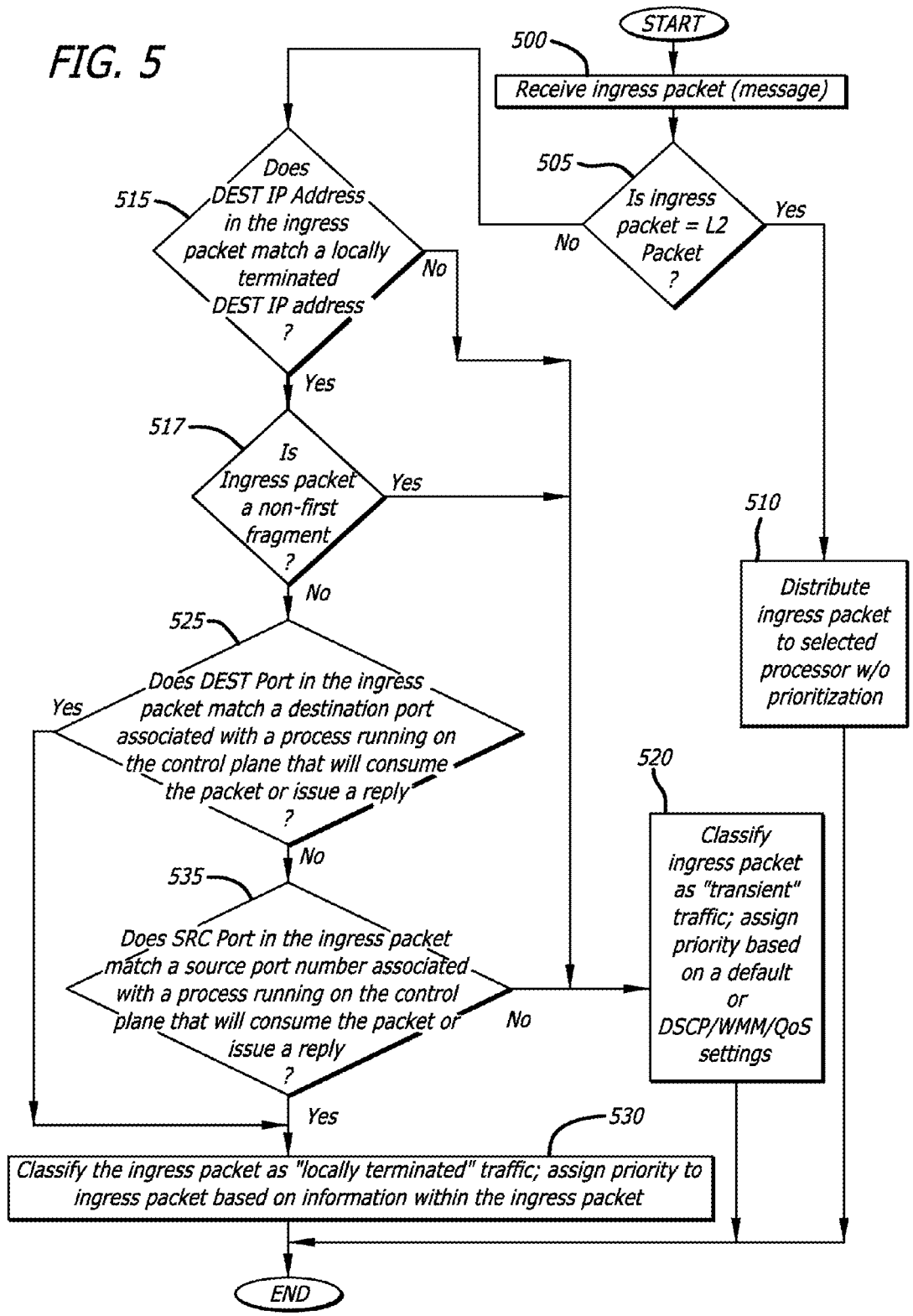
FIG. 5 is an exemplary embodiment of a general flowchart outlining operations for classifying and prioritizing an ingress control packet.

Referring now to FIG. 5, an exemplary embodiment of a flowchart outlining operations for classifying and prioritizing an ingress control message (e.g., ingress control packet) is shown. According to one embodiment of the disclosure, these operations are conducted by micro-core engine 320 of FIG. 3.

Upon receipt of an ingress packet, a determination is made as to whether the ingress packet is an L2 packet (blocks 500 and 505). If so, the ingress packet is distributed to one of the plurality of processors without conducting further packet inspection (block 510).

If the ingress packet is an L3 packet, a first determination is made whether the DEST IP address in the ingress packet matches a locally-terminated DEST IP address (block 515). If no match is detected, the ingress packet is classified as "transient" control traffic. According to this embodiment of the disclosure, this ingress packet may be assigned a default priority or may be assigned priority based on its Differentiated Service Code Point (DSCP), Wireless Multimedia Extensions (WMM), or Quality of Service (QoS) settings (block 520).

If the ingress packet matches a locally-terminated DEST IP address, and if the ingress packet is a first fragment, a second determination is made as to whether the DEST PORT identified in the ingress packet matches a destination port number associated with an active process running on the control plane that will consume the ingress packet or cause a reply (blocks 517, 520 and 525). If the DEST PORT matches the destination port number, the ingress packet is classified as "locally-terminated" control traffic and priority is assigned based information within the ingress packet itself (block 530). For instance, protocol information within the packet is used to assign priority.

However, if no match is detected, a third determination is made as to whether the SRC Port identified in the ingress packet matches a source port number associated with an active process running on the control plane that will consume the ingress packet or cause a reply (block 535). If the SRC PORT matches the source port number, the ingress packet is classified as "locally-terminated" control traffic and priority is assigned based information as described in block 530. However, if a match is not detected, the ingress packet is classified as "transient" control traffic and may be assigned default or DSCP/WMM/QoS-based priority (block 520).

Figure 6A:
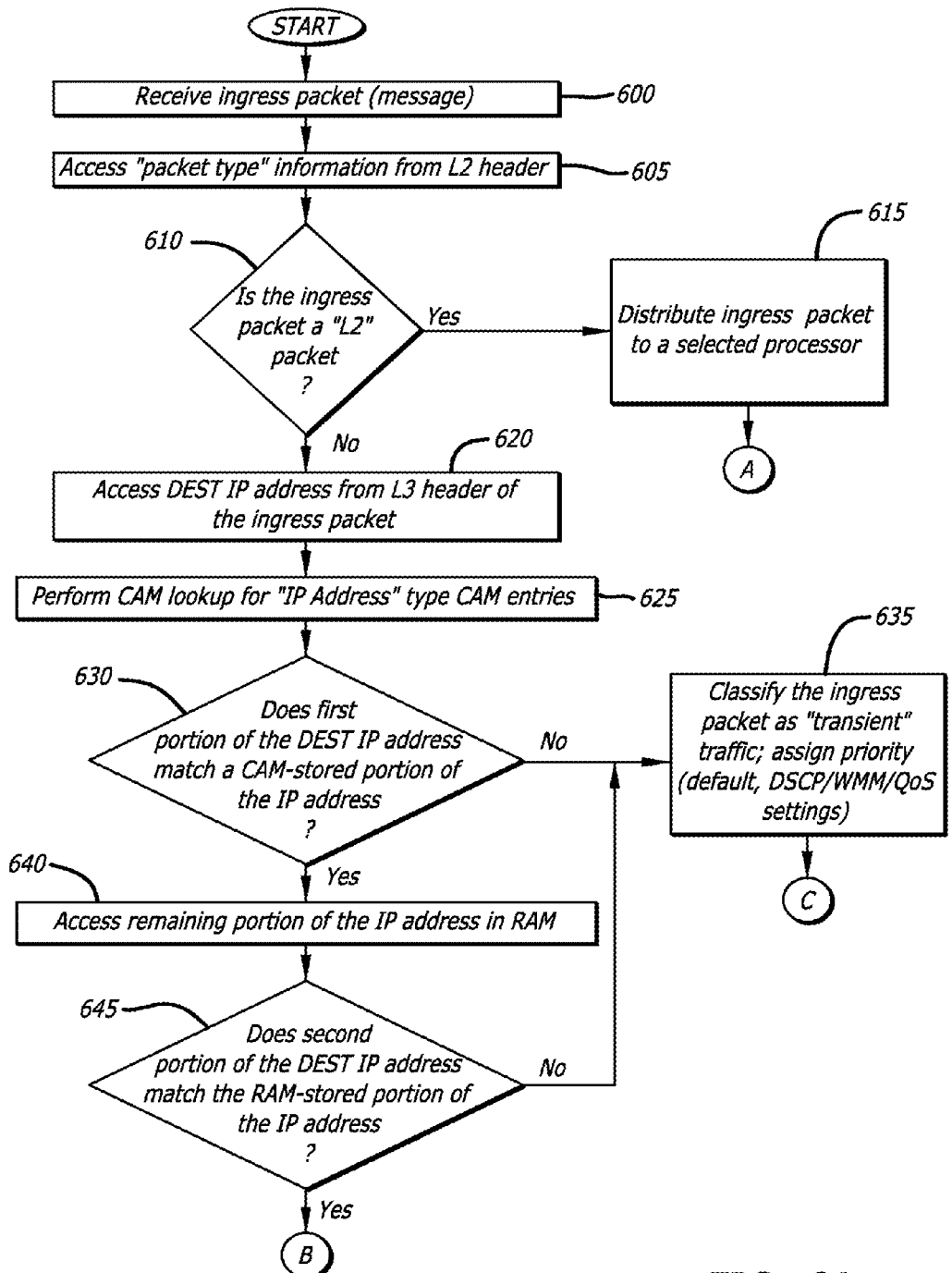
FIGS. 6A-6B illustrate an exemplary embodiment of a more detailed flowchart outlining classification and prioritization operations conducted by a micro-core logic unit on an ingress control packet.
Figure 6B:
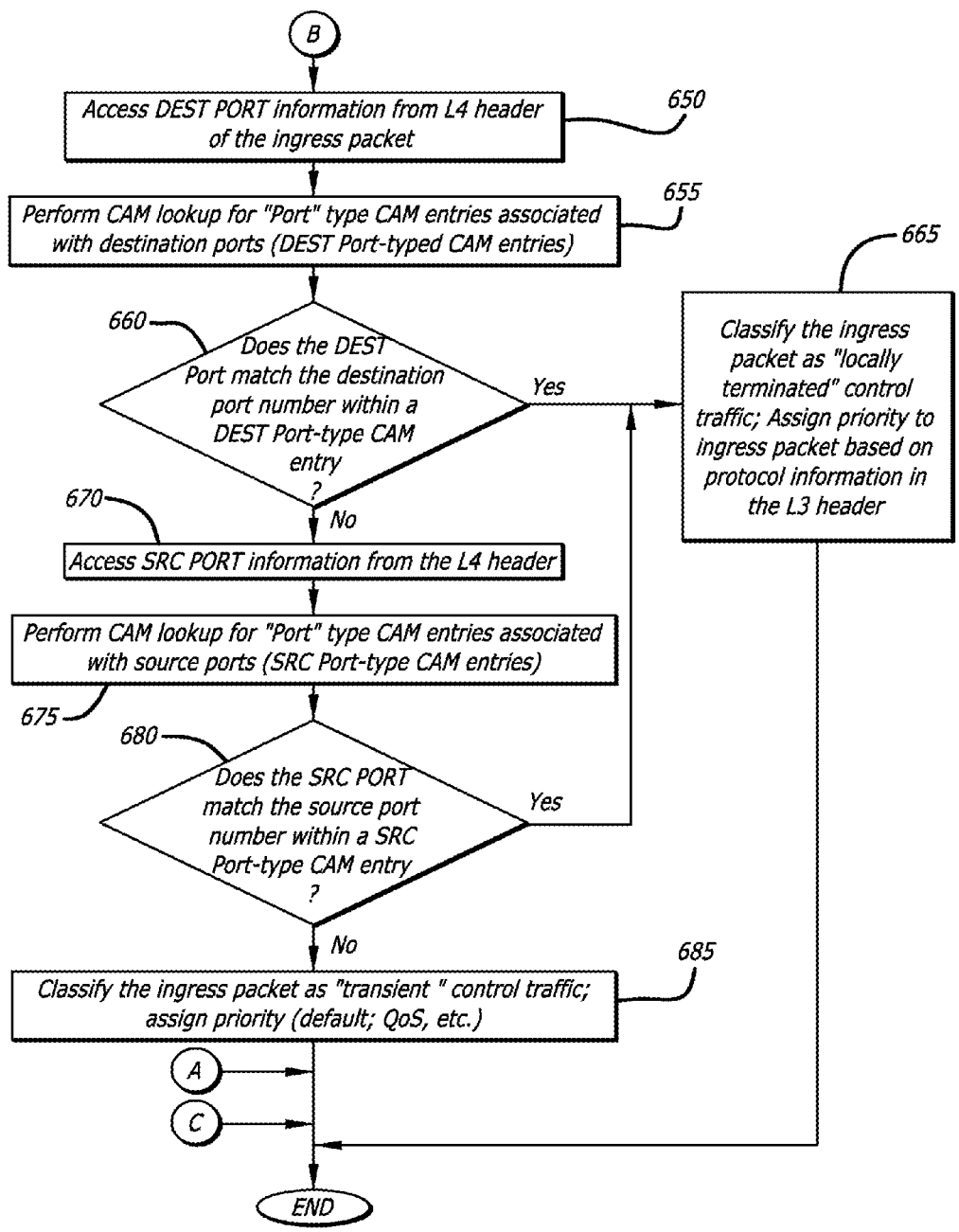

Referring now to FIGS. 6A-6B, an exemplary embodiment of a more detailed flowchart outlining classification and prioritization operations conducted by a micro-core logic unit on an ingress control packet is shown, where size-constrained, low-latency memory (CAM) is used for partial address lookup with larger memory having higher latency (RAM) being subsequently accessed using index information from the CAM to complete the address lookup.

Initially, the micro-core logic unit receives an ingress control packet and accesses packet type information from its L2 header (blocks 600 and 605). If the micro-core logic unit determines from the packet type information that the ingress control packet is merely an L2 packet, information associated with the L2 packet is distributed to one of the processors (blocks 610 and 615).

However, if the ingress control packet is an L3 packet, the micro-core logic unit accesses the DEST IP address from its L3 header and performs a CAM lookup for entries associated with locally-terminated IP addresses (hereinafter "IP address type" CAM entries) as set forth in blocks 620 and 625. Thereafter, the micro-core logic unit compares a first portion of the DEST IP address to a CAM-stored portion of the IP address (block 630).

If a match is not detected, the micro-core logic unit classifies the ingress control packet as "transient" control traffic (block 635). Upon such classification, the micro-core logic unit may be adapted to assign a priority to the ingress control message for processing at the control plane. According to this embodiment of the disclosure, the priority may be a default priority or assigned based on the DSCP, WMM or QoS settings in the ingress control packet.

However, if a match is detected, the micro-core logic unit accesses the second stored portion of the IP address stored in a secondary storage (e.g., RAM) and determines if a second portion of the DEST IP address matches the RAM-stored portion of the IP address (blocks 640 and 645). This comparison is performed to ensure a complete match of the DEST IP address with a locally-terminated destination IP address.

If a complete match is not determined, the micro-core logic unit classifies the ingress control message as transient control traffic (block 630). With such classification, the ingress control message may be assigned a default priority or DSCP, WMM or QoS-based priority as described above.

For instance, according to the illustrative example of these operations, the micro-core logic unit determines which CAM entries have been configured to store locally-terminated destination IP addresses. For instance, type information 702 identifies CAM entry 700 as an "IP address type" CAM entry. Similarly, type information 712 identifies CAM entry 710 as a "Port-type" CAM entry.

Figure 7A:
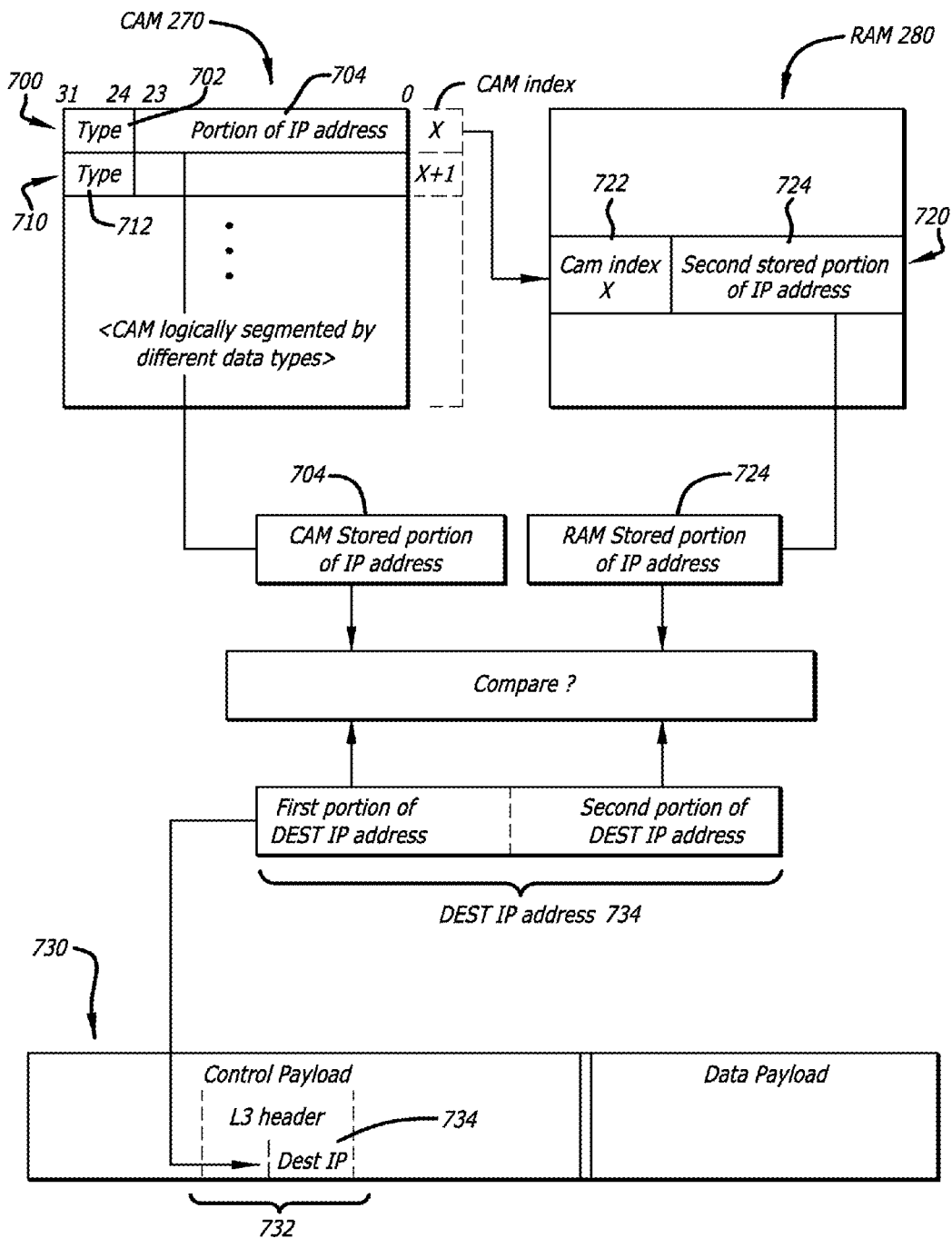
FIG. 7A is an exemplary embodiment of a first series of classification operations conducted for an ingress control packet.

According to one embodiment of the disclosure, as further shown in FIG. 7A, CAM entry 700 stores a first portion of a locally-terminated destination IP address 704 (e.g., 3 most significant bytes) while a second portion 724 of this destination IP address (e.g. least significant byte for IPv4 and 13 bytes for IPv6) is stored in a separate secondary storage 280 for subsequent comparison as described below.

The micro-core logic unit accesses CAM-stored portion 704 of the destination IP address for comparison with the first portion (e.g., 3 bytes) of a DEST IP address 734 within a L3 header 732 of an ingress control packet 730. Upon a successful comparison, the micro-core logic unit accesses the RAM-stored portion 724 of the destination IP address and compares the RAM-stored portion 724 (e.g. least significant byte for IPv4 and 13 bytes for IPv6) to a second portion of the DEST IP address. Upon a successful comparison, the micro-core logic unit determines that DEST IP address 732 matches the locally-terminated destination IP address.

Referring now to FIG. 6B, if a match of the full DEST IP address is detected, the micro-core logic unit accesses the DEST PORT from the L4 header of the ingress control packet and performs a CAM lookup for DEST port type entries within the CAM (blocks 650 and 655). Thereafter, the micro-core logic unit conducts a comparison of the DEST PORT with destination port numbers within DEST port type entries of the CAM (block 660).

If a match is detected, the micro-core logic unit classifies the ingress control packet as "locally terminated" control traffic and accesses protocol information within the L3 header of the ingress control packet. Based on the protocol information, the micro-core logic unit assigns priority in handling the ingress control packet (block 665).

For instance, as shown in FIG. 8 as an illustrative example, packet classification mapping 800 is a hardcoded table that provides each micro-core logic unit with an ability to assign priority based on the protocol type contained with the L3 header of the ingress control packet. Herein, each descriptor buffer pool 810 is assigned a particular priority and may be configured to support one or more protocol types. For instance, ingress GRE messages are assigned to a descriptor buffer pool 820 having a first priority while ingress SNMP messages are assigned to a descriptor buffer pool 830 having a second priority. The use of reserved buffer pools having different priority levels allows higher priority traffic to always have buffer resources to send traffic to the main processor for further processing.

Referring back to FIG. 6B, if a match is not detected, the micro-core logic unit accesses the SRC PORT from the L4 header in the ingress control packet and performs a CAM lookup for SRC port type entries within the CAM (blocks 670 and 675). Thereafter, the micro-core logic unit compares the SRC PORT to source port number(s) within one or more CAM entries (block 680).

If a match is determined, the micro-core logic unit classifies the ingress control message as locally-terminated control traffic to be prioritized (block 665). As a result, the micro-core logic unit accesses the protocol within the L3 header and, based on the protocol, assigns a particular priority to information within ingress control packet. However, if a match is not determined, the micro-core logic unit classifies the ingress control message as "transient" traffic. Upon such classification, the ingress control message may be assigned a default priority or assigned a priority based on the QoS attributed to the ingress control message (block 685).

Figure 7B:
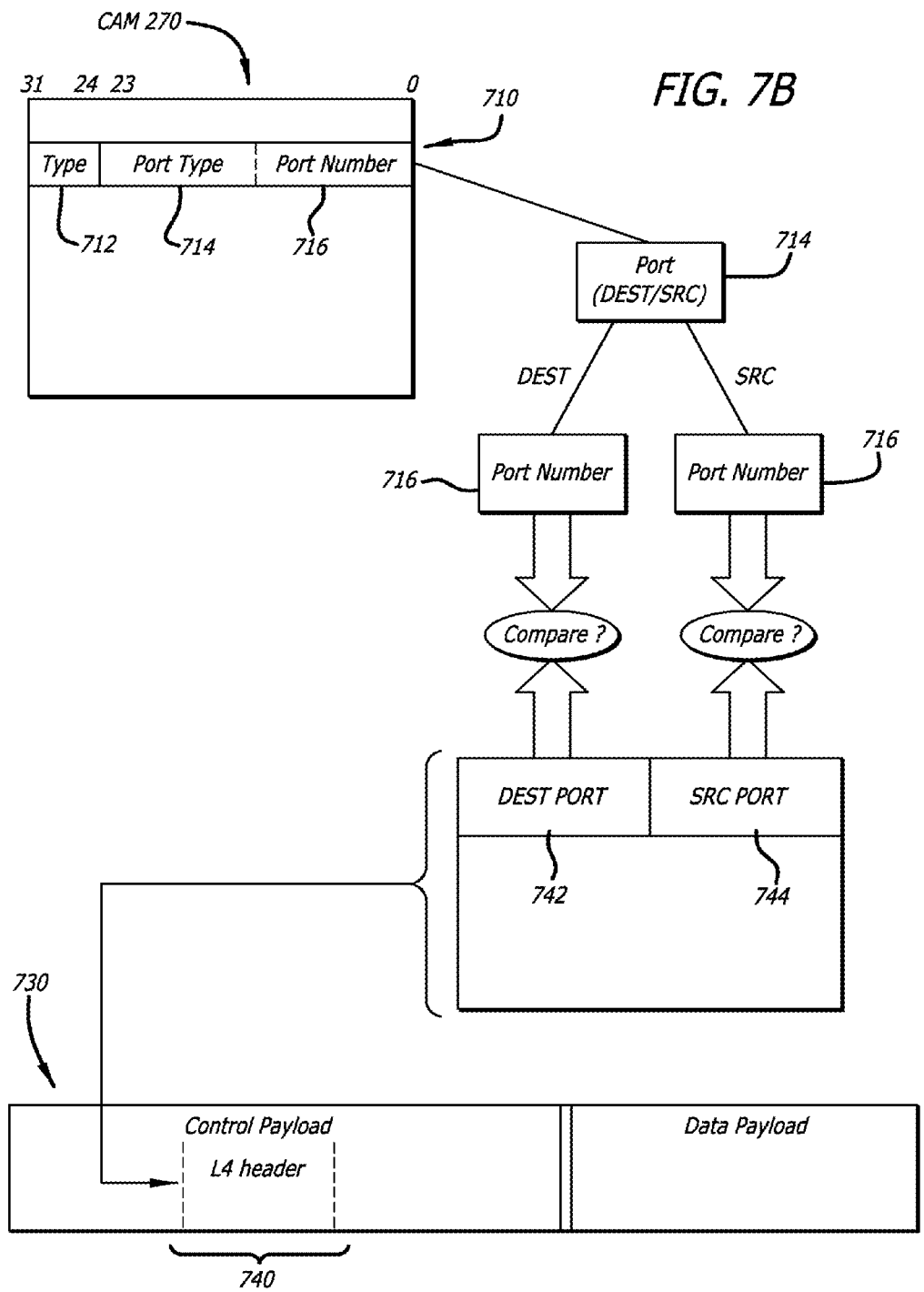
FIG. 7B is an exemplary embodiment of a second set of classification operations conducted for the ingress packet.

For instance, according to the illustrative example of these operations, as shown in FIG. 7B, the micro-core logic unit determines "Port-type" CAM entries for destination port numbers associated with active processes running on the control plane that will consume the ingress control packet or cause a reply. For instance, type information 712 identifies CAM entry 710 as a "Port-type" CAM entry.

When conducting an analysis of DEST PORT 742 accessed in L4 header 740 of ingress control packet 730, before comparing DEST PORT 742 to port number 716, the micro-core logic unit further analyzes port field 714 within CAM entry 710 in order to confirm that that entry contains a destination port number. Likewise, if conducting analysis of SRC PORT 744, before comparing SRC PORT 744 to port number 716, the micro-core logic unit further analyzes port field 714 to confirm that that entry contains a source port number. Thereafter, the DEST PORT and/or the SRC PORT is (are) compared to the corresponding port number 716.

III. ACL Programming of Message Classification Data

Figure 9:
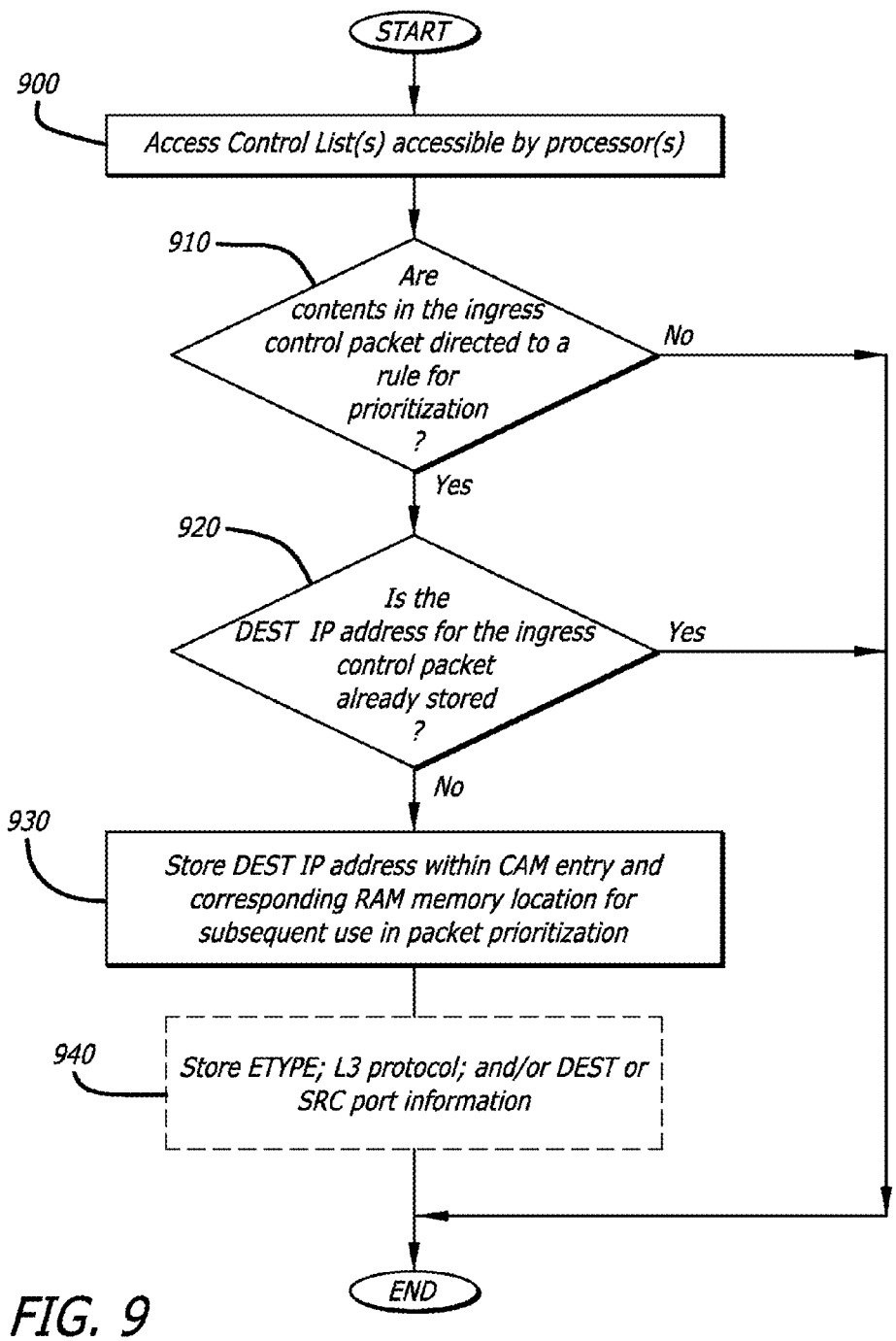
FIG. 9 is an exemplary embodiment of the functionality deployed within one or more processors within the processing logic to dynamically re-program priority for selected locally-terminated control traffic.

Referring now to FIG. 9, an exemplary embodiment of the functionality deployed within one or more processors within the processing logic to dynamically re-program priority for selected locally-terminated control traffic is shown. Herein, normally defined by network administrators, one or more access control lists (ACLS) are used to customize prioritization of traffic over the network. Each entry in an ACL comprises (1) information to identify whether incoming ingress packets constitute locally-terminated control traffic (e.g., L3/L4 header parameters—DEST IP address, SRC IP address, DEST PORT and/or SRC PORT), and (2) the priority associated with this locally-terminated control traffic.

Herein, the contents of the ACL are accessible by each processor (block 900). Upon receiving an ingress control message, the processor determines whether the contents of the ingress control message match a rule associated with an ACL (block 910). For instance, the rule may prioritize messages associated with a particular protocol. If so, a determination is made by the processor if the IP DEST address for the ingress control message has already been stored within the CAM (block 920). If so, the process continues (block 930). If not, at a minimum, the DEST IP address is stored within a CAM entry and a corresponding RAM memory location for subsequent use in packet prioritization (block 940). Optionally, as shown in block 950, the EthernetType (ETYPE), Protocol (L3) and/or DEST/SRC port information may be stored within one or more CAM entries as well.

As an illustrative example, the ACL may be programmed to denote that SNMP messages are to be prioritized. Upon receiving the SNMP message, the processor accesses the ACL and determines that the contents of the SNMP message needs to be prioritized and determines, by accessing a shadow table mirroring the contents of the CAM, if the access control has already been programmed in the CAM. If not, the DEST IP address for the SNMP message is stored for subsequent retrieval in classifying and/or prioritizing messages.

Hence, constrained CAM resources can be managed automatically using the ACL hits on policy assigned to all IP addresses associated with the digital device (e.g., all controller/switch IP addresses). Based on ACL hits, corresponding actions to prioritize the DEST IP address, the SRC port and/or the DEST port can be used to populate the CAM table, an entry of which is shown in FIG. 2B. Further, IP addresses to which the Aps correspond can be pushed to the CAM, thus managing the CAM efficiency. For example, if the ACL for SNMP traffic is configured to prioritize the traffic, then only when there is SNMP traffic on a specific VLAN will trigger the update of the constrained resource with the ports and IP address used for SNMP polling.

IV. Dynamic Load Balancing

Figure 10A:
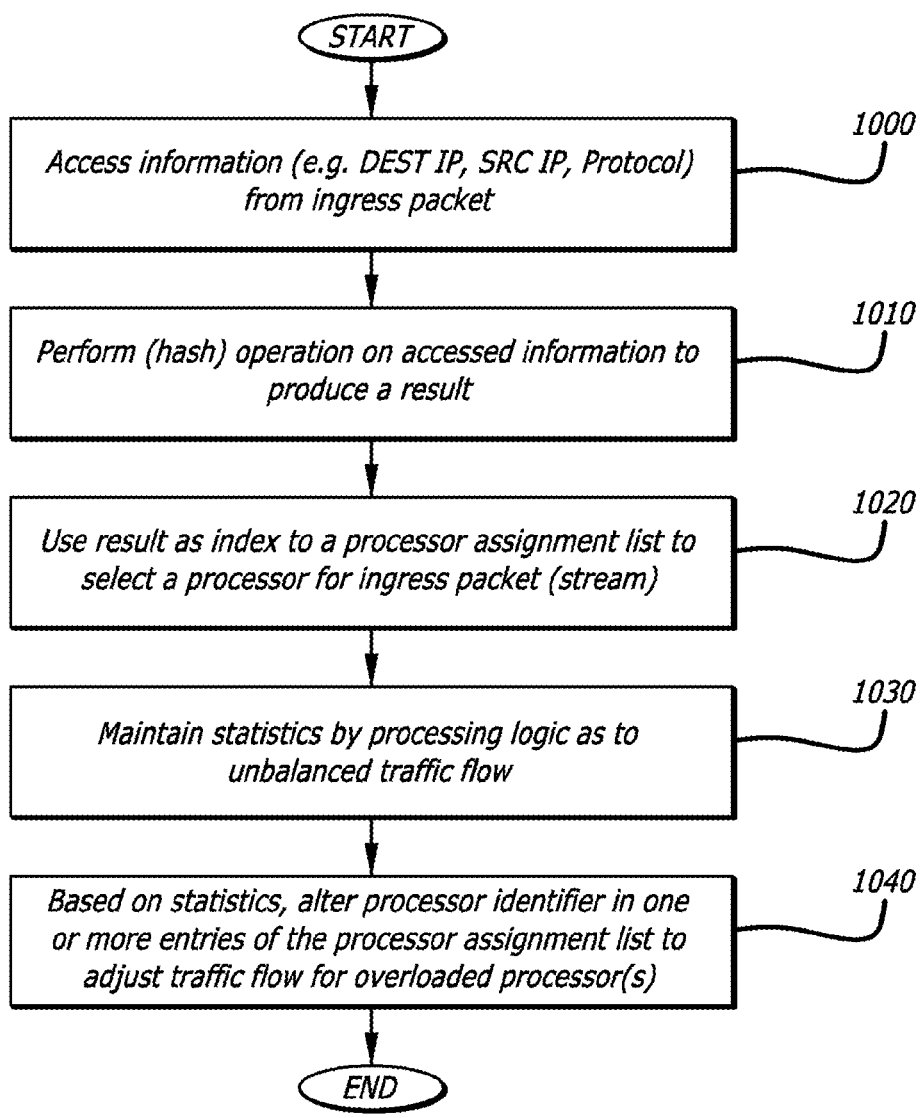
FIG. 10A is an exemplary embodiment of a flowchart illustrating dynamic load balancing of traffic flow of ingress packets to processors based on statistical information feedback.

Referring to FIGS. 10A-10D, an exemplary embodiment of dynamic load balancing of traffic flow of ingress packets to processors based on monitored statistical information feedback to the micro-core engine of FIG. 3 is shown. According to this embodiment of the disclosure, as illustrated in FIGS. 10A and 10B, the micro-core engine accesses information 1052 within L3 header 1050 (e.g., DEST IP address 1054, SRC IP address 1056, and protocol 1058) for an ingress control packet 1045 (see block 1000 of FIG. 10A).

Thereafter, as shown in block 1010 of FIG. 10A and illustrated in details in FIGS. 10B and 10C, the micro-core engine performs a transformation (e.g., one-way hash operation 1060) on accessed information 1052 to produce a result 1065. In particular, as shown in block 1020 of FIG. 10A, result 1065, in whole or in part, operates as an index to a processor assignment list 1070. Sized with a number of entries substantially greater in number than the number of processors (e.g., greater than 10x) in order to provide a fairer distribution of traffic flow across the processors, processor assignment list 1070 is a collection of processor identifiers identifying which processor is targeted to receive which ingress message. Where result 1065 is a 12-bit value, processor assignment list 1070 features 4096 entries. A selected processor is assigned to each entry of processor assignment list 1070, perhaps in a round-robin fashion, in an initial attempt to evenly allocate processor usage.

Each processor maintains statistics in order to identify unbalanced traffic flow by monitoring traffic flow associated with each entry (hash result). Based on the maintained statistics, one of the processors may be adapted to alter one or more entries in the processor assignment list 1070. For instance, when the load of a first processor exceeds a first threshold, the first processor may be adapted to remove its processor identifier from one or more entries within processor assignment list 1070 to reduce its load. The first processor may substitute its processor identifier for another processor identifier within the data plane processing logic.

Of course, there are other alternatives for dynamically balancing processor load. For instance, a second processor different than the first processor may alter one or more entries in processor assignment list 1070 to offload traffic flow to the first processor. In another alternative embodiment, when a load of a processor falls below a second threshold being less than the first threshold, the processor may be adapted to modify entries within processor assignment list 1070 and substitute its processor identifier for other processor identifier(s).

This alteration is conducted to remove an identifier ($CPU_2$) associated with an overloaded processor and substitute an identifier ($CPU_5$) associated with a processor having a lesser load (block 1040). The selection of the particular entry or entries 1072 and 1074 for substitution with an identifier for the processor having the lesser load ($CPU_5$, $CPU_7$) may be arbitrary, provided the altered entry (or entries) is (are) associated with the overloaded processor ($CPU_2$) as shown in FIGS. 10A and 10D.

Figure 11:
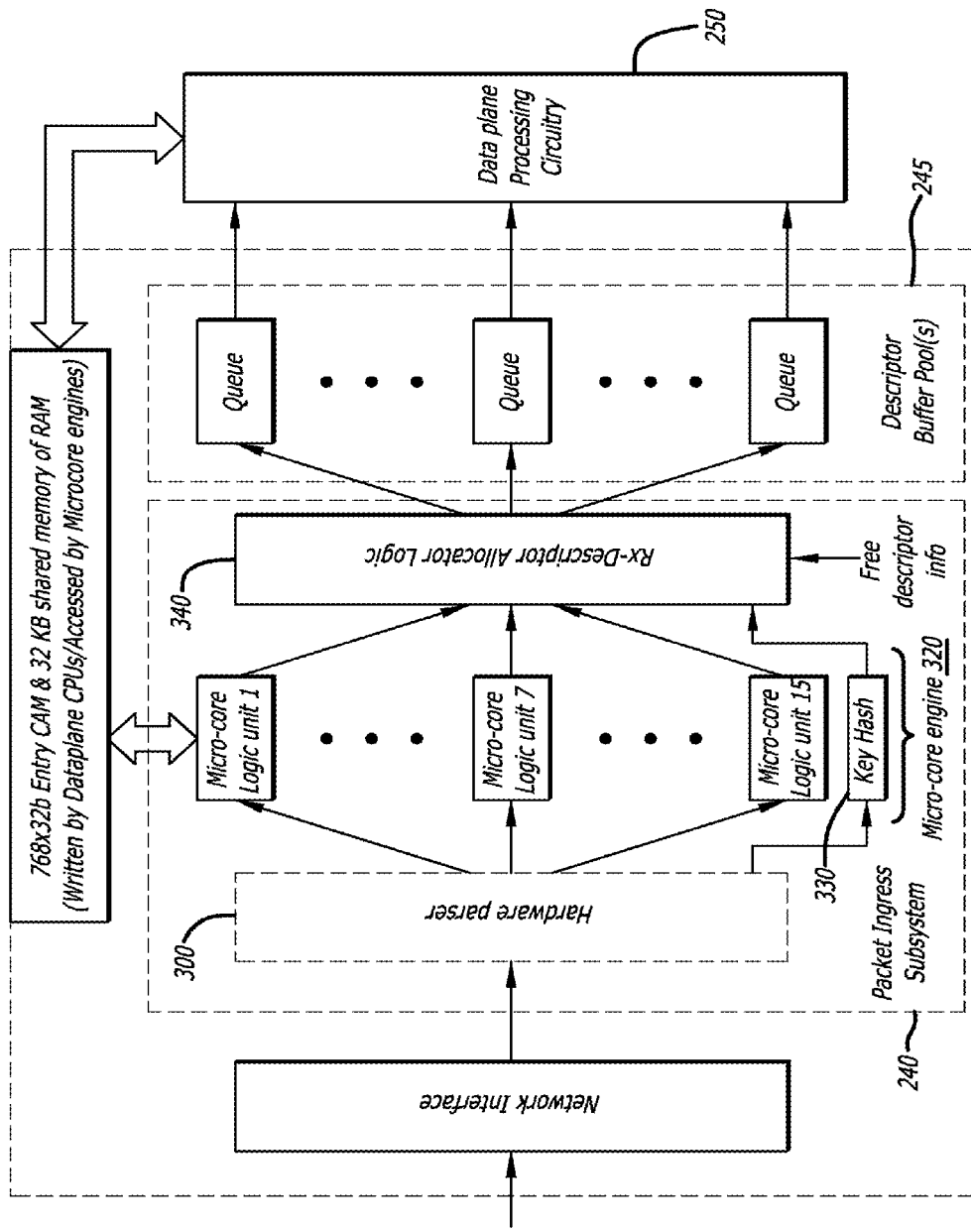
FIG. 11 is an exemplary block diagram of the network acceleration engine in classifying, prioritizing and dynamically load balancing traffic prior to receipt by one or more processors.

Referring now to FIG. 11, an exemplary block diagram of network acceleration engine 230 is shown. As previously shown in FIGS. 2A and 3, network acceleration engine 230 comprises message ingress subsystem 240 to classify and prioritize locally-terminated ingress control messages. As additionally shown, data plane processing circuitry 250, operating in combination with micro-core engine 320, dynamically load balances locally-terminated control traffic through controlled alteration of processor assignment list being part of shared (RAM) memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the appended claims and their equivalents. For instance, the results of the DEST IP address analysis described above can be ignored in favor of using ETYPE/L3 Protocol/WMM/QoS or DEST/SRC port in the packet in order to select the descriptor buffer pools for prioritization. Also, higher prioritization (and different buffer pool assignment) may be applied to a first fragment having an L4 header than subsequent fragments without L4 headers. The description is thus to be regarded as illustrative instead of limiting.

What is claimed is:

1. A method comprising:
   receiving, by a network controller, a respective ingress message, wherein the network controller comprises at least a plurality of micro processing cores and a shared random access memory accessible to the plurality of micro processing cores and a plurality of data processors;
   in response to the respective ingress message being a locally terminated packet,
   assigning processing responsibility of the respective ingress message to a first data processor of the plurality of data processors based on a respective hash result and a data processor assignment stored in the shared random access memory, wherein the respective hash result operates as an index to the data processor assignment which has a greater number of entries than a total number of the plurality of data processors;
   maintaining statistics of traffic flows associated with the first data processor, wherein the statistics of traffic flows include a traffic flow associated with the respective hash result;
   determining that a load corresponding to the first data processor exceeds a first threshold; and
   transferring processing responsibility of the respective ingress message from the first data processor to a second and different data processor among the plurality of data processors by a respective data processor substituting a first data processor identifier corresponding to the first data processor indexed by the respective hash result with a second data processor identifier corresponding to a second data processor in the data processor assignment.

2. The method of claim 1, wherein the transferring of the processing responsibility of the respective ingress message comprises a respective data processor removing the first data processor identifier from one or more entries in the data processor assignment.

3. The method of claim 1, wherein the transferring of the processing responsibility of the respective ingress message comprises the first data processor substituting the first data processor identifier corresponding to the first data processor indexed by the respective hash result with a second data processor identifier corresponding to the second data processor of the plurality of data processors.

4. The method of claim 3, wherein the second data processor has a lesser operating load than the first data processor.

5. The method of claim 1, wherein the transferring of the processing responsibility of the respective ingress message is performed by a third data processor of the plurality of data processors in response to the load corresponding to the first data processor exceeding the first threshold.

6. The method of claim 1, wherein the transferring of the processing responsibility of the respective ingress message is performed by the second data processor of the plurality of data processors in response to a load corresponding to the second data processor being below a second threshold that is lower than the first threshold.

7. The method of claim 1 further comprising:
monitoring ingress traffic associated with each hash result corresponding to an entry in the data processor assignment, wherein the data processor assignment includes a second plurality of entries greater in number than the plurality of processors with each entry of the plurality of entries includes a data processor identifier;
reassigning processing responsibility of the respective ingress message based on load associated with a particular hash result.

8. The method of claim 1, further comprising:
randomly selecting the one or more entries in the data processor assignment from which the respective data processor removes the first data processor identifier corresponding to the first data processor in response to the load corresponding to the first data processor exceeding the first threshold.

9. The method of claim 3, further comprising:
randomly selecting one or more data processors of the plurality of data processors other than the first data processor; and
substituting the first data processor identifier corresponding to the first data processor with a set of data processor identifiers corresponding to the one or more data processors.

10. A network controller comprising:
a plurality of micro processing cores;
a plurality of data processors;
a shared random access memory accessible to the plurality of micro processing cores and a plurality of data processors;
the plurality of micro processing cores to:
receive a respective ingress message;
in response to the respective ingress message being a locally terminated packet, assign processing responsibility of the respective ingress message to a first data processor of the plurality of data processors based on a respective hash result and a data processor assignment stored in the shared random access memory, wherein the respective hash result operates as an index to the data processor assignment which has a greater number of entries than a total number of the plurality of data processors;
maintain statistics of traffic flows associated with the first data processor, wherein the statistics of traffic flows include a traffic flow associated with the respective hash result;
determine that a load corresponding to the first data processor exceeds a first threshold; and
transfer processing responsibility of the respective ingress message from the first data processor to a second and different data processor among the plurality of data processors by a respective data processor substituting a first data processor identifier corresponding to the first data processor indexed by the respective hash result with a second data processor identifier corresponding to a second data processor in the data processor assignment.

11. The network controller of claim 10, wherein a respective data processor removes the first data processor identifier from one or more entries in the data processor assignment.

12. The network controller of claim 10, wherein a third data processor of the plurality of data processors performs the transferring of the processing responsibility of the respective ingress message in response to the load corresponding to the first data processor exceeding the first threshold.

13. The network controller of claim 10, wherein the second data processor of the plurality of data processors performs the transferring of the processing responsibility of the respective ingress message in response to a load corresponding to a load corresponding to the second data processor being below a second threshold that is lower than the first threshold.

14. The network controller of claim 10, wherein the plurality of micro processing cores further to:
monitor ingress traffic associated with each hash result corresponding to an entry in the data processor assignment, wherein the data processor assignment includes a second plurality of entries greater in number than the plurality of processors with each entry of the plurality of entries includes a data processor identifier;
reassign processing responsibility of the respective ingress message based on load associated with a particular hash result.

15. The network controller of claim 10, wherein the plurality of data processors further to:
randomly select the one or more entries in the data processor assignment from which the respective data processor removes the first data processor identifier corresponding to the first data processor in response to the load corresponding to the first data processor exceeding the first threshold.

16. The network controller of claim 10, wherein the first data processor substitutes the first data processor identifier corresponding to the first data processor indexed by the respective hash result with a second data processor identifier corresponding to the second data processor of the plurality of data processors.

17. The network controller of claim 16, wherein the second data processor has a lesser operating load than the first data processor.

18. The network controller of claim 16, wherein the plurality of data processors further to:

randomly select one or more data processors of the plurality of data processors other than the first data processor; and substitute the first data processor identifier corresponding to the first data processor with a set of data processor identifiers corresponding to the one or more data processors.

* * * * *